US006881942B2

(12) United States Patent
Huang et al.

(10) Patent No.: US 6,881,942 B2
(45) Date of Patent: Apr. 19, 2005

(54) READOUT OF ARRAY-BASED ANALOG DATA IN SEMICONDUCTOR-BASED DEVICES

(75) Inventors: Steve Huang, Arcadia, CA (US); Lin Ping Ang, Pasadena, CA (US)

(73) Assignee: Micron Technology, Inc., Boise, ID (US)

(*) Notice: Subject to any disclaimer, the term of this patent is extended or adjusted under 35 U.S.C. 154(b) by 10 days.

(21) Appl. No.: 10/114,130

(22) Filed: Apr. 1, 2002

(65) Prior Publication Data

US 2002/0139921 A1 Oct. 3, 2002

Related U.S. Application Data

(60) Provisional application No. 60/280,589, filed on Mar. 30, 2001.

(51) Int. Cl.[7] .............................................. H01L 27/00
(52) U.S. Cl. ................................ 250/208.1; 250/214 R
(58) Field of Search .......................... 250/208.1, 214 R, 250/214 A, 214 LA, 214.1; 341/155, 159; 358/482, 483; 348/208.99, 660, 639, 572, 573

(56) References Cited

U.S. PATENT DOCUMENTS

| | | |
|---|---|---|
| 5,471,515 A | 11/1995 | Fossum et al. |
| 5,841,126 A | 11/1998 | Fossum et al. |
| 5,900,934 A * | 5/1999 | Gilby et al. ............... 356/344 |
| 6,072,355 A | 6/2000 | Bledsoe |
| 6,150,968 A | 11/2000 | Tsay et al. |
| 6,229,134 B1 | 5/2001 | Ang et al. |

FOREIGN PATENT DOCUMENTS

| | | |
|---|---|---|
| EP | 1 085 522 A1 | 3/2001 |
| EP | 1 115 244 A2 | 7/2001 |
| EP | 1 115 244 A3 | 3/2002 |
| WO | WO 00/62530 | 10/2000 |

OTHER PUBLICATIONS

Koren, Brock, "Photodiodes—Tutorial," Spie's OE Magazine, Aug. 2001.
"Understanding Pipelined ADCs," dbserv.maxim-ic.com/tarticle/view_article.cfm?article_id=383, Mar. 22, 2002.
Eric R. Fossum, "Low Power Camera-on-a-Chip Using CMOS Active Pixel Sensor Technology", 1995, IEEE, pp. 74–77, (month unknown).
Nakamura et al., "A CMOS Analog Front–End Chip–Set for Mega Pixel Camcorders", ISSCC 2000 / Session 11 / Integrated Sensors and Display Circuits / Paper TA 11.6, pp. 190–191, (month unknown).

* cited by examiner

Primary Examiner—Que T. Le
(74) Attorney, Agent, or Firm—Dickstein Shapiro Morin & Oshinsky LLP

(57) ABSTRACT

Systems and techniques to readout array-based analog data with reduced power requirements and reduced fixed pattern noise. An image sensor on an integrated circuit may include a sensor array to provide array-based analog data, a parallel sampling circuitry to receive the array-based analog data in parallel, a pipelined amplification circuitry to serially amplify the received array-based analog data, and an analog-to-digital converter to convert the amplified array-based analog data into digital data.

35 Claims, 8 Drawing Sheets

READOUT OF ARRAY-BASED ANALOG DATA IN SEMICONDUCTOR-BASED DEVICES

CROSS REFERENCE TO RELATED APPLICATIONS

This application claims the benefit of the priority of U.S. Provisional Application Ser. No. 60/280,589, filed Mar. 30, 2001 and entitled "LOW POWER DIFFERENTIAL CHARGE MODE READOUT CIRCUIT, PIPELINED GAIN STAGE, AND PIPELINED ADC FOR CMOS ACTIVE PIXEL SENSORS".

BACKGROUND

The present application describes systems and techniques relating to semiconductor-based imaging devices, for example, reducing fixed pattern noise in single-chip active pixel sensors.

A traditional design for an image sensor on a semiconductor chip consists of an image sensor array, column circuitry that includes a gain stage, an analog-to-digital converter and digital control logic to generate control signals. Traditional image sensors can introduce fixed pattern noise, which is undesirable in high-quality imaging systems, such as camera systems designed to operate in low light levels. A typical approach to suppress such fixed pattern noise is to add calibration circuitry, which generally increases design complexity and power requirements.

SUMMARY

The present application teaches an array-based analog data readout architecture with reduced power requirements and reduced fixed pattern noise. The array-based analog data readout architecture may perform a serial pipelined amplification outside of a parallel array sampling circuitry. Pipelining uses two separate clock signals to alternately reset and amplify array data stored in the parallel sampling circuitry. A pipelined analog-to-digital converter may be used to further reduce power requirements. The array-based analog data readout architecture may be used with active pixel sensors on integrated circuits in high-quality imaging systems.

One or more of the following advantages may be provided. The systems and techniques described may result in reduced fixed pattern noise in high-quality imaging systems, such as in camera systems designed to operate in low light levels. Low-power readout of analog data on an integrated circuit may result in reduced power dissipation and corresponding reduced dark current.

Additionally, the reduced complexity of parallel sampling circuitry may result in fewer layout limitations due to pixel pitch. The reduced complexity may also result in signal gain with reduced area and optimized performance, and higher yield during manufacturing of integrated circuits that use the systems and techniques described.

Details of one or more implementations are set forth in the accompanying drawings and the description below. Other features and advantages may be apparent from the description and drawings, and from the claims.

DRAWING DESCRIPTIONS

These and other aspects will now be described in detail with reference to the accompanying drawings.

Like reference symbols in the various drawings indicate like elements.

DETAILED DESCRIPTION

Figure 1:
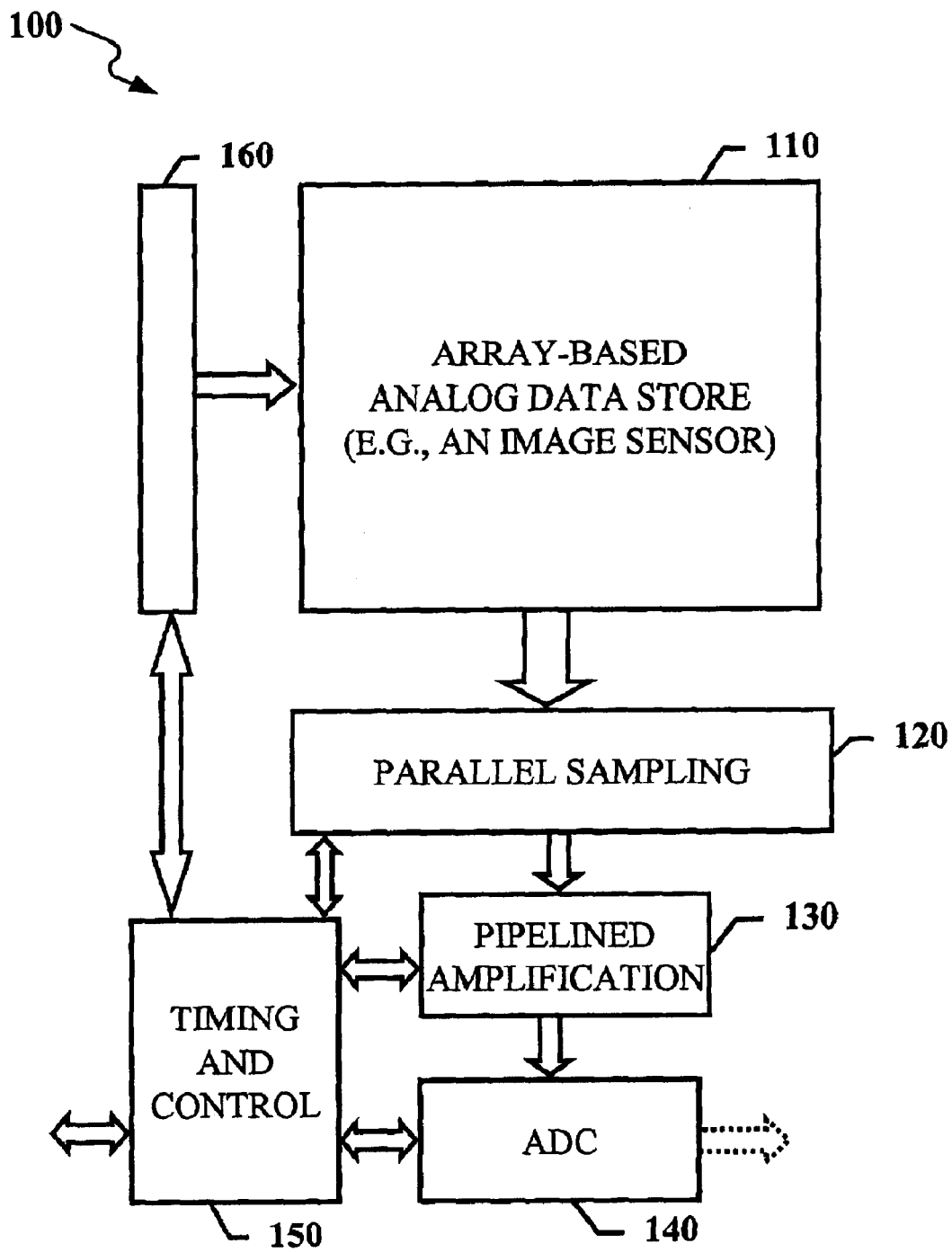
FIG. 1 shows a basic block diagram of an array-based analog data readout system.

FIG. 1 shows a basic block diagram of an array-based analog data readout system 100. The data readout system 100 may be integrated onto a single chip, which can include an array-based analog data store 110. The array-based analog data can be saved in the system 100 or collected by the system 100. For example, the array-based analog data store 110 may be a sensor array, such as an image sensor including an array of pixels, integrated onto the same chip as the data readout system. The array-based analog data store 110 may be a memory array, such as an analog memory circuitry, used to save analog data. Moreover, the array may be more than two-dimensional, such as may be used in a holographic memory device.

The array-based analog data readout system 100 includes a parallel sampling circuitry 120 to receive array-based analog data in parallel from the array-based analog data store 110. The sampling circuitry 120 may be column parallel sample and hold (S/H) and charge mode readout circuitry. Additionally, the sampling circuitry 120 may be configured to perform correlated double sampling of the data store 110.

The system 100 includes a pipelined amplification circuitry 130, which may be a programmable pipelined gain stage. The pipelined amplification circuitry 130 is configured to serially amplify analog data received from the parallel sampling circuitry 120. The amplification circuitry 130 may sequentially amplify column data in a sampled row.

The pipelined amplification circuitry 130 may be fully differential and may be implemented using switched capacitor circuits. Moreover, the pipelined amplification circuitry 130 may include programmable capacitors optimized to provide a gain of two in a first gain stage. Such programmable capacitors also may be optimized for other gains of more or less than two. In general, a first gain stage, which is connected with an array, may be optimized to larger gain values as the size of the array decreases and/or as the parasitic capacitance of the array and/or the connections to it decreases. In this optimization, there is a general tradeoff between noise, speed and power.

The array-based analog data readout system 100 includes an analog-to-digital converter (ADC) 140, which receives amplified data from the pipelined amplification circuitry 130 and outputs digital data, such as to an output port (e.g., one or more output pins on an integrated circuit (IC) chip). The ADC 140 may be a pipelined ADC. The ADC 140 may be a fully differential error-correcting pipelined ADC. Additionally, the output of digital data may be back through a control circuitry 150, where processing of the digital data may occur, such as described below.

The system 100 includes the control circuitry 150 coupled with the parallel sampling circuitry 120, the pipelined amplification circuitry 130, and the ADC 140. The control circuitry 150 provides timing and control to the array-based analog data readout system, including managing the parallel to serial interaction between the sampling circuitry 120 and the amplification circuitry 130.

The control circuitry 150 can provide timing and control to a driving circuitry 160, which may be part of the system 100. For example, the driving circuitry 160 may include row logic to select rows in the array-based analog data store 110. The driving circuitry 160 may include latches, counters and decoders. The system 100 also may include current and voltage bias circuitry, which may be part of the driving circuitry 160.

The control circuitry 150 may also provide additional processing of digital data from the ADC 140, before the digital data is output. Examples of such digital processing operations include digital calibration and outlier detection. In an image sensor implementation, digital calibration may include black level calibration and correction, where data created by dark current in the device can be detected, such as by data shifts that correlate with temperature change, and corrected for. Outlier detection may include detection of large deviations (up or down), such as might be caused by a dead pixel, and correction of the inaccurate data, such as by median filtering or other techniques.

Figure 2:
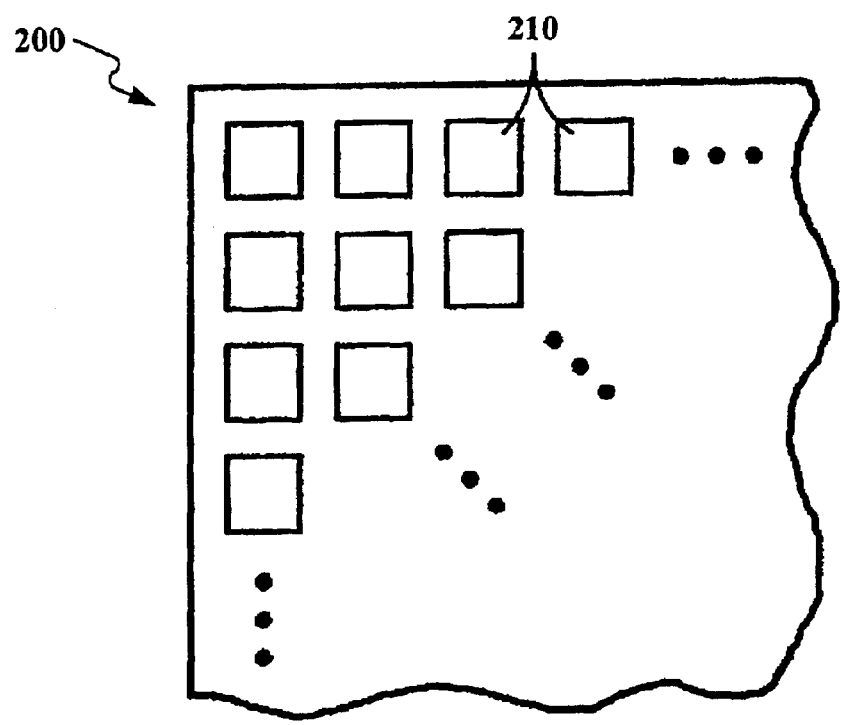
FIG. 2 shows an integrated circuit having an array of pixels.

FIG. 2 shows an integrated circuit 200 having an array of pixels 210. The integrated circuit 200 is an example implementation of the array-based analog data readout system above. A pixel 210 includes a photodetector that receives photons and converts the received photons into an electrical signal, such as an electric charge formed and stored over an integration period. The photodetectors enable the array of pixels to form an electrical representation of an image.

A photodetector may be a photogate or a photodiode, such as a four-transistor photodiode. A pixel may be a passive pixel or an active pixel. An active pixel includes both a photodetector and some form of amplifier, such as a source follower.

The integrated circuit 200 may include additional logical components as described in connection with FIGS. 1 and 4–8. The integrated circuit 200 may include additional operational components and/or materials, such as optical components and/or materials. Moreover, the integrated circuit 200 may be formed using a standard manufacturing process, such as a metal oxide semiconductor (MOS) or complementary metal oxide semiconductor (CMOS) fabrication process.

Figure 3:
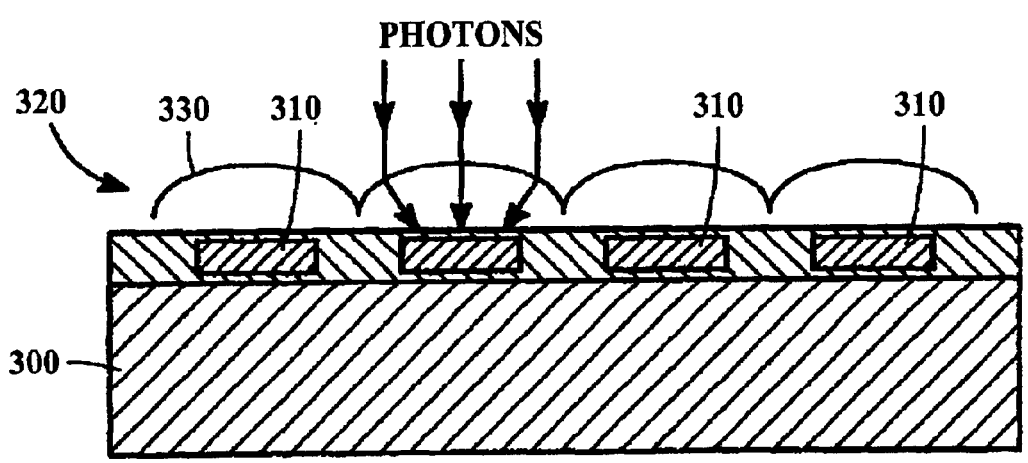
FIG. 3 shows a cross-sectional view of an integrated circuit having an array of pixels and a micro-lens layer.

FIG. 3 shows a cross-sectional view of an integrated circuit having an array of pixels 310 and a micro-lens layer 320. The pixels 310 are formed on a substrate 300. The micro-lens layer 320 includes a transparent optical material that causes incident photons to refract, resulting in more of the incident photons striking the pixels 310.

The micro-lens layer 320 may include a spherical portion 330 centered over a cell 310. Additionally, the micro-lens layer 320 may be constructed to optimize image sensor performance. For example, the micro-lens layer 320 may be applied as described in U.S. patent application Ser. No. 60/286,908, filed Apr. 27, 2001 and entitled "METHOD FOR OPTIMIZING MICROLENS/CFA/PIXEL COOPERATIVE PERFORMANCE IN IMAGE SENSORS".

Figure 4:
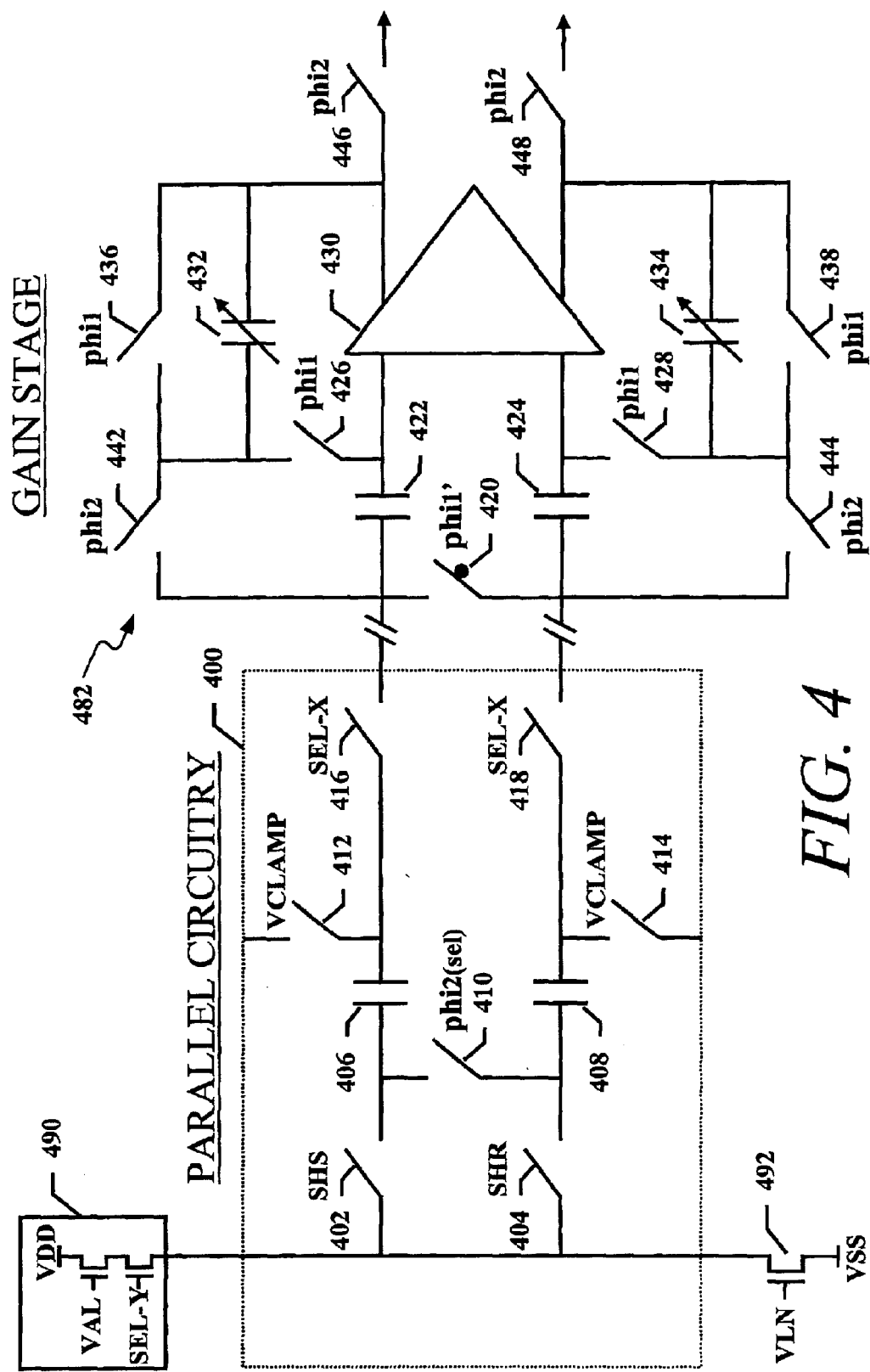
FIG. 4 shows a parallel sample and hold and charge mode readout circuitry and a fully differential serial gain stage.

FIG. 4 shows a parallel sample and hold and charge mode readout circuitry 400 and a fully differential serial gain stage 482. A single instance of the parallel circuitry 400 is illustrated. The parallel circuitry 400 may be connected with an array-based analog data store. For example, the single instance of the parallel circuitry 400 may be connected with an image sensor array having a pixel 490, which includes a source follower transistor (controlled by VAL) and a select transistor (controlled by SEL-Y).

The select transistor may be a row select transistor, thus the parallel circuitry 400 may be column parallel circuitry. An additional transistor 492 may provide a bias, VLN, for the source follower transistor, and the transistor 492 may be considered part of the parallel circuitry 400.

The circuitry illustrated in FIG. 4 shows switched capacitor circuitry that performs correlated double sampling, which can help reduce fixed pattern noise from the array. Once a portion of the array is selected to be sampled in parallel, bias switches, such as switches 412, 414, are closed (VCLAMP) to bias output plates on value storing capacitors, such as capacitors 406, 408. A signal switch 402 is closed (Sample and Hold Signal) to read out the signal value from the pixel and store the signal level (the difference between the signal value and the VCLAMP) onto the capacitor 406.

The signal switch 402 is opened and the photodetector in the pixel is reset. Then, a reset switch 404 is closed (Sample and Hold Reset) to read out the reset value from the pixel and store the reset level onto the capacitor 408. The capacitors 406, 408 may have the same capacitance. The capacitance varies with application requirements, and in general, there is a tradeoff between noise and power consumption.

Once the parallel circuitry 400 has sampled the signal and reset levels, the stored values are read out of the parallel circuitry in series. The gain stage 482 is sequentially connected with the instances of the parallel circuitry 400. On a first clock signal (phi1), the gain stage 482 is reset. On a second clock signal (phi2), the gain stage 482 amplifies a serially selected input. These two clock signals, phi1 and phi2, are non-overlapping; thus, phi1 goes down before phi2 goes up, and visa versa.

The first clock signal (phi1) closes switches 426, 428, 436, 438. This places the gain stage 482 in a voltage following mode (i.e., unity gain, high input resistance and low output resistance). The gain stage 482 may include a fully differential operational amplifier ("op-amp") 430, which may use any of a variety of op-amp topologies, such as a folded cascode op-amp. The gain stage 482 may also include offset capacitors 422, 424.

A shortened first clock signal (phi1') begins with the first clock signal (phi1) and ends at a time delta-t before the first clock signal (phi1). Phi1' may be phi1 shortened by 5%. The input plates on the offset capacitors 422, 424 are shorted by closing of a switch 420, and this switch 420 opens before the switches 426, 428, 436, 438. Making phi1' turn off first causes the offset associated with the gain stage 482 to be captured on the offset capacitors 422, 424 during the reset.

When an instance of the parallel circuitry 400 is to be amplified, select switches 416, 418 close (SEL-X). The first clock signal (phi1) closes switches 426, 428, 436, 438 to reset the gain stage 482. The shortened first clock signal (phi1') opens the switch 420 to capture the offset on the offset capacitors 422, 424.

The second clock signal (phi2) closes switches 442, 444, 446, 448 to amplify the input to the gain stage 482. An additional clock signal, phi2(sel), closes a switch 410 inside the selected instance of the parallel circuitry 400 to short the input plates of the capacitors 406, 408. The values stored on the output plates of the capacitors 406, 408 are connected with the input plates of the offset capacitors 422, 424 and with programmable capacitors 432, 434 through the switches 442, 444. The output voltage passes through the switches 446, 448 and has a gain based on the ratio between the capacitors 406, 408 and the programmable capacitors 432, 434.

The additional clock signal, phi2(sel), corresponds to the second clock signal (phi2) and the selected instance of the parallel circuitry 400. Phi2(sel) may be generated by external control logic (e.g., control logic in the control circuitry 150). Alternatively, the second clock signal (phi2) may be used inside the parallel circuitry 400 along with additional select switches.

Figure 5:
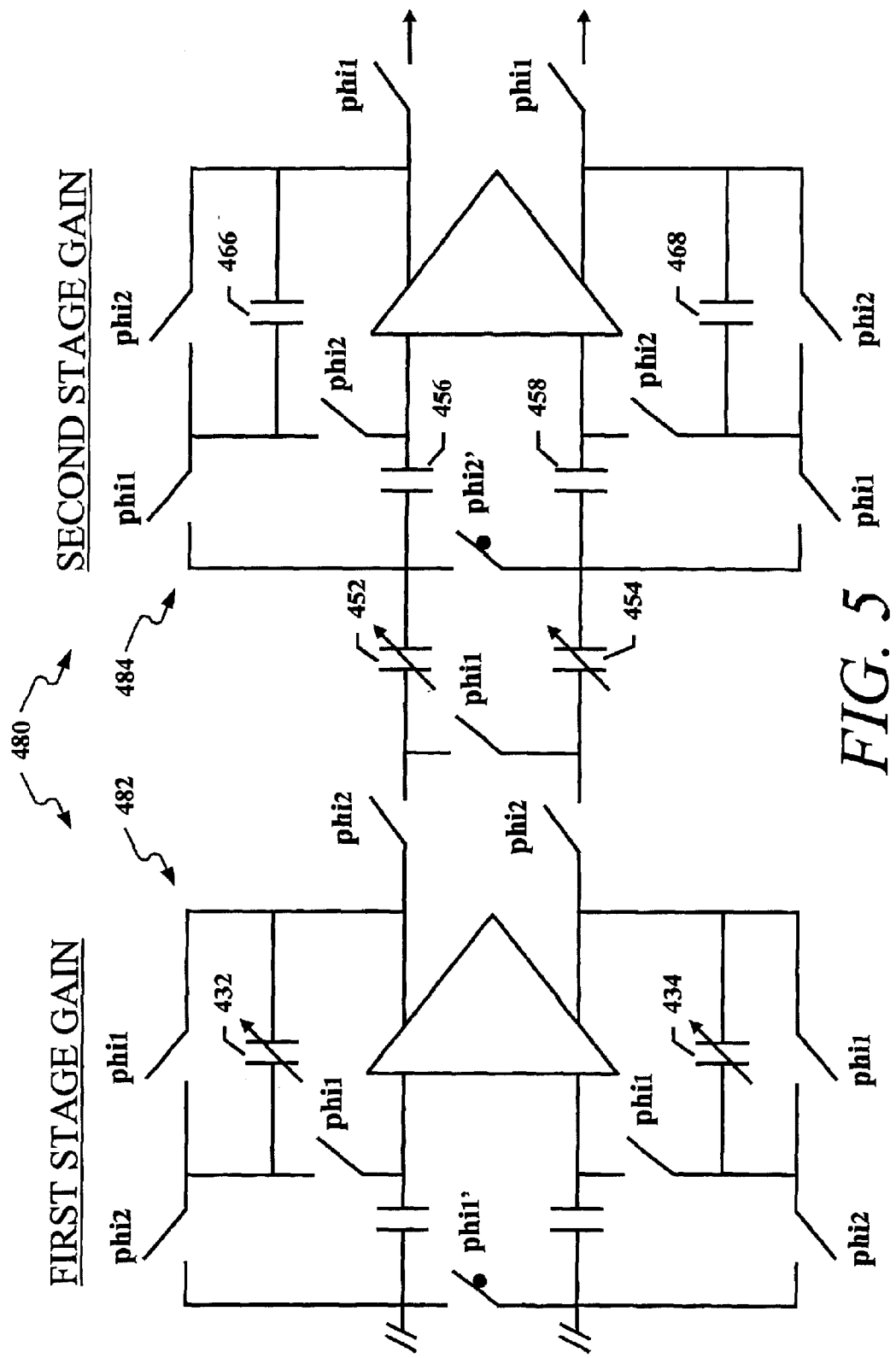
FIG. 5 shows a fully differential pipelined gain stage.

FIG. 5 shows a fully differential pipelined gain stage 480. The pipelined gain stage 480 has two gain stages, a first stage gain 482 and a second stage gain 484. The first stage gain 482 may operate as described above. The output from the first stage gain 482 is stored on programmable capacitors 452, 454.

The second stage gain 484 generally operates in the same manner as the first stage gain 482, but with the opposite clock signals. On the second clock signal (phi2), the second stage gain 484 is reset. On the first clock signal (phi1), the second stage gain 484 amplifies the output from the first stage gain 482.

A shortened second clock signal (phi2') functions similarly to the delayed first clock signal (phi1'). The shortened second clock signal (phi2') begins with the second clock signal (phi2) and ends at a time delta-t before the second clock signal (phi2). Making phi2' turn off first causes the offset associated with the second stage gain 484 to be captured on offset capacitors 456, 458 during the reset.

The second stage gain 484 has internal capacitors 466, 468 that are not programmable. Thus, the programmable capacitors 452, 454 in the pipeline are used to control the gain of the second stage gain 484. Similar programmable capacitors may be used for all later stage gains in the pipeline.

The capacitors in the pipelined gain stage, such as the capacitors 432, 434, 452, 454, need not be programmable. However, these programmable capacitors provide control over the gains imparted by each stage, thus making the pipelined gain stage programmable and more versatile. These programmable capacitors may be optimized to provide predetermined gains in various gain stages. For example, the programmable capacitors 432, 434 may be optimized to provide a gain determined by the application for the pipelined gain stage (e.g., a gain of less than two, three, four, five, six, seven, or eight).

Because the parallel circuitry connects to the first gain stage in the pipeline, there may be a large parasitic capacitance at that connection point, which reduces a feedback factor for the op-amp in the first gain stage. Putting more gain on the first gain stage may reduce noise requirements for the later stages, but also increases power requirements. However, the optimum gain for the first stage may vary with the manufacturing process used.

Figure 6:
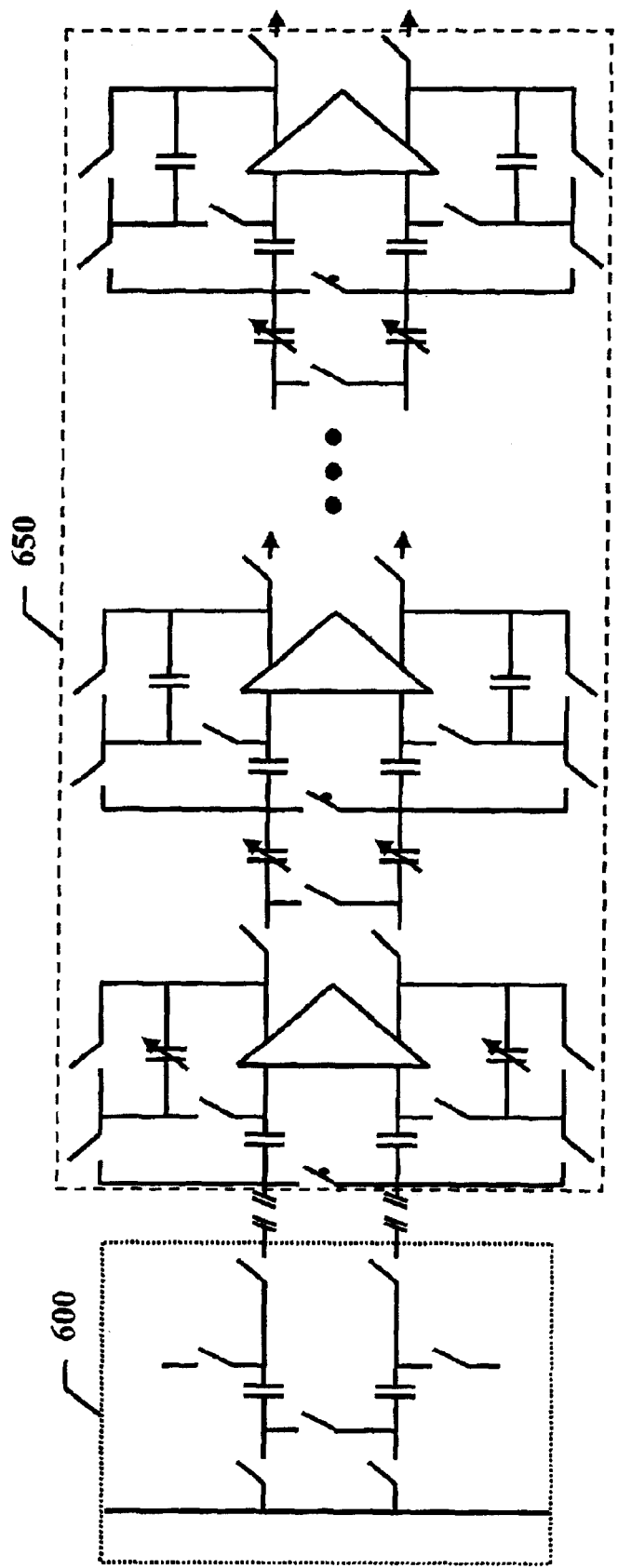
FIG. 6 shows a parallel sampling circuitry and a fully differential pipelined gain stage.

FIG. 6 shows a parallel sampling circuitry 600 and a fully differential pipelined gain stage 650. The parallel sampling circuitry 600 operates as described above. Moreover, the parallel sampling circuitry 600 includes no amplifiers. The parallel sampling circuitry 600 includes as little circuitry as possible in order to minimize design complexity, power consumption and fixed pattern noise for the parallel sampling circuitry 600.

The fully differential pipelined gain stage 650 operates as described above. The fully differential pipelined gain stage 650 includes three or more stages that alternate their use of the clock signals, and thus alternate reset and amplification operations. By breaking the gain into stages, a high gain may be achieved with lower overall power requirements. Thus, a lower power IC may be produced.

The number of stages to use in the pipeline is affected by design requirements (e.g., total gain and speed for the chip) and the manufacturing technology being used. The number of stages may be determined by running simulations of various circuits using standard simulation software to determine power consumption. Additionally, although the circuitry described above is fully differential, single-ended circuitry may also be used.

Figure 7:
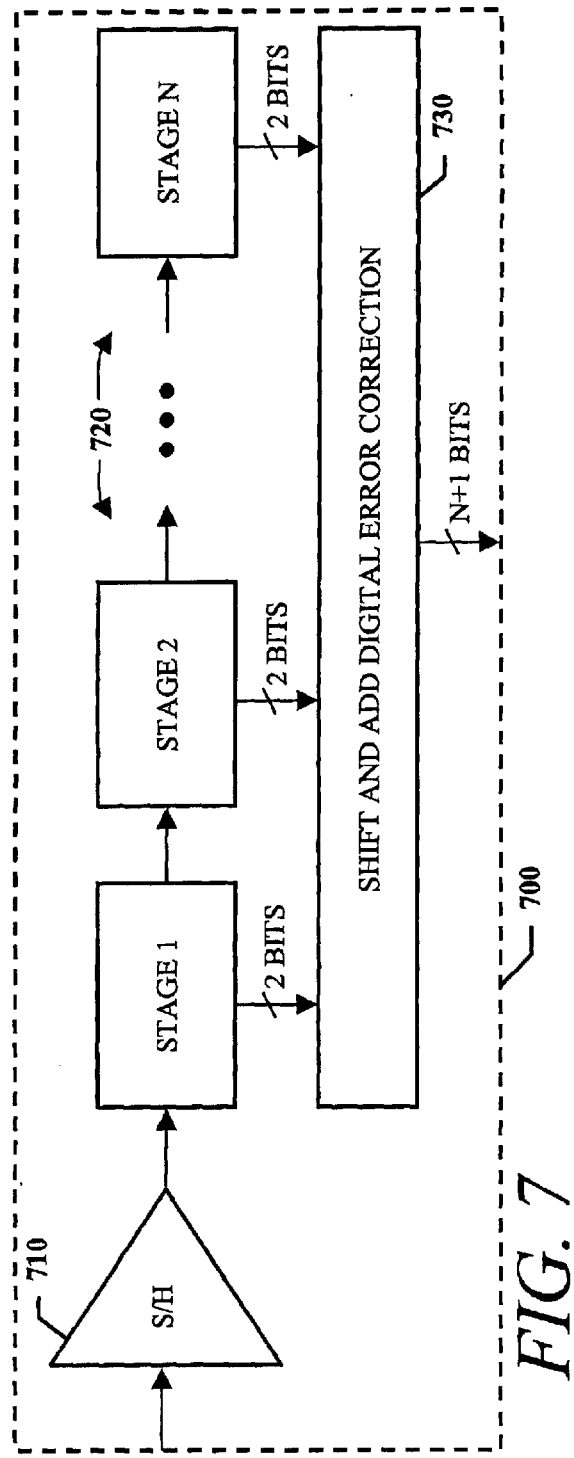
FIG. 7 shows a pipelined analog-to-digital converter.

FIG. 7 shows a pipelined analog-to-digital converter 700. The ADC 700 receives the output from the pipelined gain stage and may be fully differential. Additionally, a translation stage may be included between the pipelined gain stage and the ADC 700. The translation stage converts the output of the gain stage to a range that is optimized for the ADC 700. For example, an output differential (e.g., 0 to 2 volts) from the pipelined gain stage may be converted to an input differential (e.g., −1 to 1 volts) tailored to a fully differential pipelined ADC.

The pipelined ADC 700 may be an error-correcting ADC. The pipelined ADC 700 may include a sample and hold 710, multiple ADC stages 720 and a shift and add digital error correction circuitry 730. An ADC stage 720 may output two bits, and the correction circuitry 730 may use overlap between the ADC stages 720 to perform error correction. Thus, the pipelined ADC 700 may be considered a "1.5 bit" ADC. The pipelined ADC 700 may have a total of nine stages for a total output of ten bits of digital data. Additionally, the ADC 700 may include a final flash ADC to perfect the final bit(s) of the output.

Figure 8:
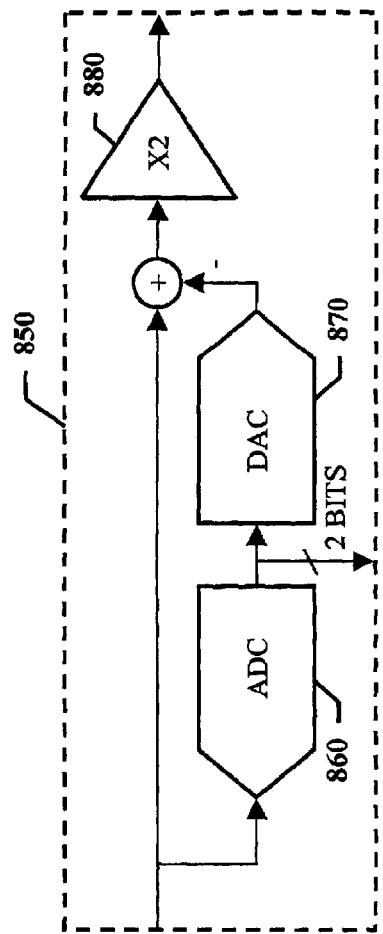
FIG. 8 shows an example stage of an error-correcting pipelined analog-to-digital converter.

FIG. 8 shows an example stage 850 of an error-correcting pipelined analog-to-digital converter. The example stage 850 includes a flash ADC 860, a digital-to-analog converter (DAC) 870, and an amplifier 880. The example stage 850 may output two bits of digital data, and be used in the pipelined ADC above.

Figure 9:
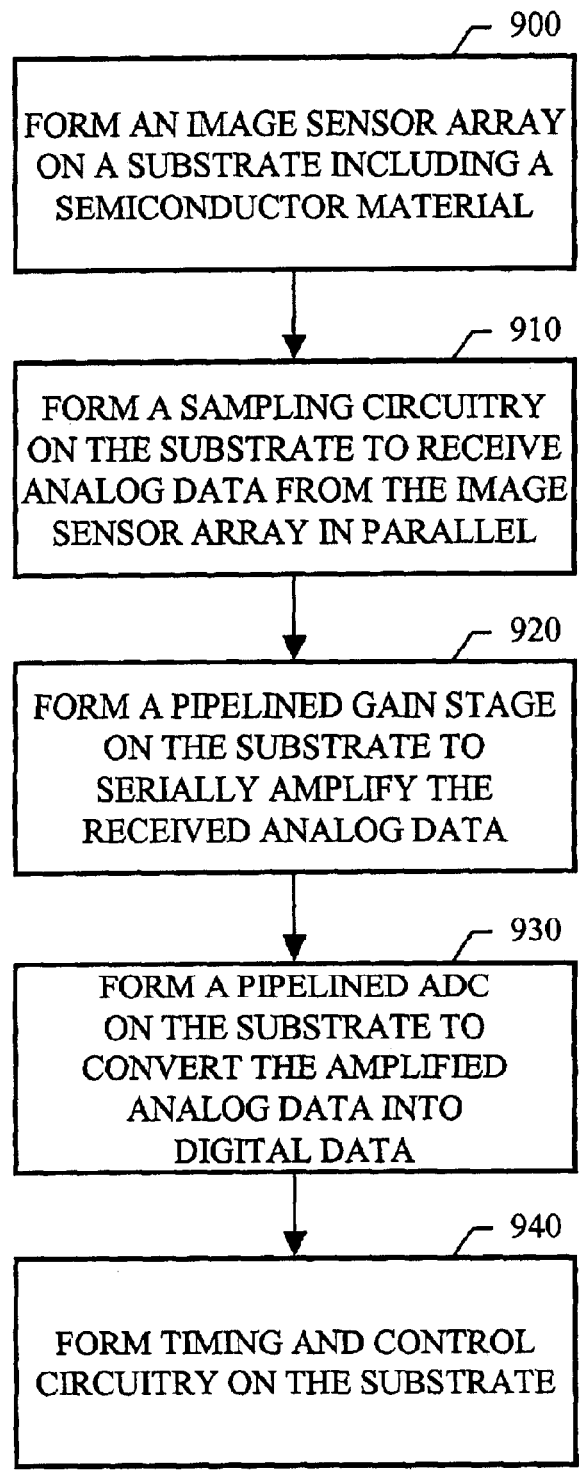
FIG. 9 shows a process of forming an image sensor on a substrate.

FIG. 9 shows a process of forming an image sensor on a substrate. An image sensor array is formed on a substrate including a semiconductor material at 900. The image sensor array may be an active pixel sensor array. A sampling circuitry is formed on the substrate at 910 to receive analog data from the image sensor array in parallel. This may involve forming correlated double sampling circuitry without amplification circuitry.

A pipelined gain stage is formed on the substrate at 920 to serially amplify the received analog data. This pipelined gain stage may be fully differential and programmable. The first stage gain of the pipelined gain stage may include programmable capacitors optimized as described above. A pipelined ADC is formed on the substrate at 930 to convert the amplified analog data into digital data. The pipelined ADC may be a fully differential 1.5 bit error-correcting ADC.

A control circuitry is formed on the substrate at 940. The control circuitry may provide functionality as described above. The control circuitry may include a timing circuitry to provide two non-overlapping clock signals to the pipelined gain stage. The control circuitry may include a sequential selecting circuitry to selectively pass the analog data from the sampling circuitry to the pipelined gain stage in coordination with one of the two non-overlapping clock signals.

The forming of circuitry described above may be done using a CMOS manufacturing process. One or more semiconductor materials may be used, such as compounds or elements including germanium, silicon, gallium arsenide, tantalum and others. Moreover, the process flow depicted in FIG. 9 does not require the particular order shown or sequential order.

Figure 10:
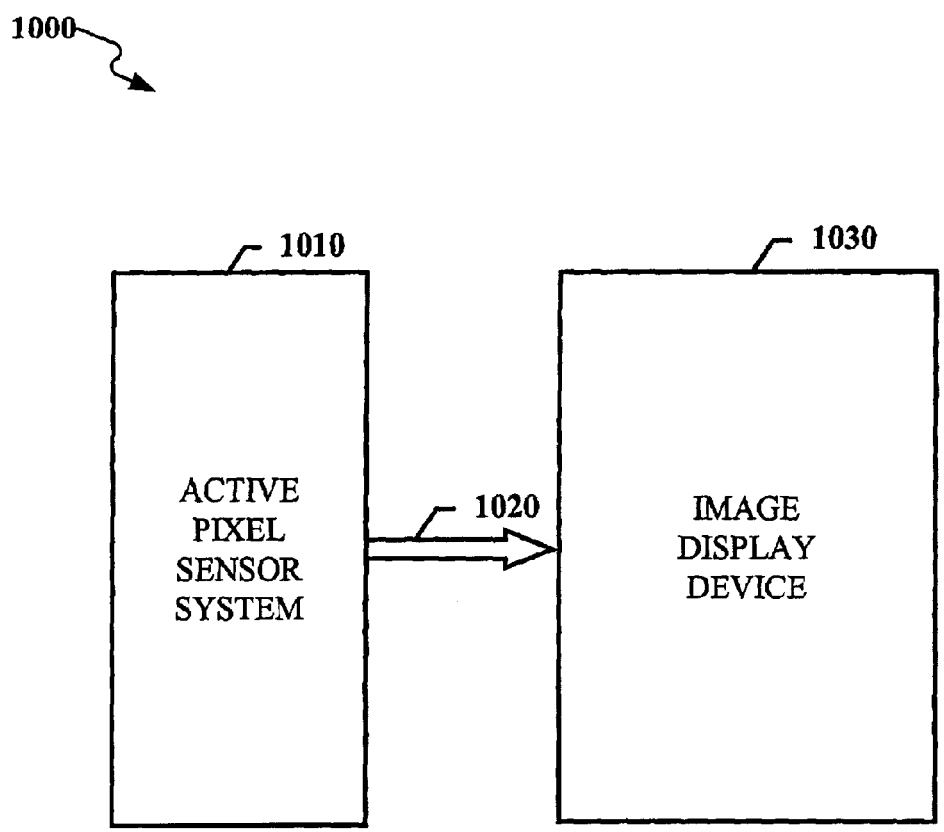
FIG. 10 shows an active pixel sensor camera system.

FIG. 10 shows an active pixel sensor (APS) camera system 1000. The system 1000 includes an APS system 1010 and an image display device 1030. The APS system 1010 includes an APS array having rows and columns of elements configured to receive photons and form an electrical representation of the received photons. The APS system 1010 includes a parallel sampling circuitry connected with the active pixel sensor array and configured to sequentially sample groups of the elements to obtain analog voltages corresponding to the electrical representations.

The APS system 1010 includes a pipelined gain stage coupled with the parallel sampling circuitry and configured to serially amplify the obtained analog voltages. The APS system 1010 includes a pipelined ADC coupled with the pipelined gain stage and configured to convert the amplified analog voltages into digital pixel data and to transfer the digital pixel data to an output port, which may be connected with the pipelined ADC or with a control circuitry as described above.

Digital pixel data 1020 is transferred from the APS system 1010 to the image display device 1030 for display. The image display device 1030 includes a display screen and is configured to transfer the digital pixel data 1020 from the output port, such that the device 1030 arranges the digital pixel data 1020 in sequential order of rows to display a visual image, corresponding to the received photons, on the display screen.

Although only a few embodiments have been described in detail above, other modifications are possible. Other embodiments may be within the scope of the following claims.

What is claimed is:

1. An integrated circuit comprising:
   a parallel sampling circuitry to receive array-based analog data in parallel;
   a pipelined amplification circuitry to serially amplify the received array-based analog data; and
   an analog-to-digital converter to convert the amplified array-based analog data into digital data.

2. The integrated circuit of claim 1, wherein the pipelined amplification circuitry comprises programmable pipelined amplification circuitry.

3. The integrated circuit of claim 2, wherein the analog-to-digital converter comprises a pipelined analog-to-digital converter.

4. The integrated circuit of claim 3, further comprising a sensor array to provide the array-based analog data.

5. The integrated circuit of claim 4, wherein the sensor array comprises an image sensor array.

6. The integrated circuit of claim 5, wherein the image sensor array comprises an active pixel sensor array.

7. The integrated circuit of claim 6, wherein the parallel sampling circuitry comprises parallel sample and hold and charge mode readout circuitry without amplification circuitry.

8. The integrated circuit of claim 7, wherein the programmable pipelined amplification circuitry comprises a differential switched capacitor circuitry including at least two programmable capacitors.

9. The integrated circuit of claim 8, wherein the pipelined analog-to-digital converter comprises a differential error-correcting analog-to-digital converter.

10. The integrated circuit of claim 9, wherein the programmable pipelined amplification circuitry comprises a first gain stage and a second gain stage, wherein the first gain stage provides a gain of less than four.

11. The integrated circuit of claim 9, wherein the programmable pipelined amplification circuitry comprises two gain stages including offset storing capacitors.

12. The integrated circuit of claim 11, wherein the programmable pipelined amplification circuitry comprises three gain stages.

13. The integrated circuit of claim 9, further comprising a control circuitry to perform digital processing operations on the digital data.

14. The integrated circuit of claim 13, wherein the digital processing operations comprise black level calibration and correction.

15. The integrated circuit of claim 14, wherein the digital processing operations further comprise outlier detection and filtering.

16. The integrated circuit of claim 9, further comprising a micro-lens layer.

17. A method comprising:
   forming an image sensor array on a substrate including a semiconductor material;
   forming a sampling circuitry on the substrate to receive analog data from the image sensor array in parallel;
   forming a pipelined gain stage on the substrate to serially amplify the received analog data; and
   forming a pipelined analog-to-digital converter on the substrate to convert the amplified analog data into digital data.

18. The method of claim 17, further comprising forming a control circuitry on the substrate.

19. The method of claim 18, wherein forming a control circuitry comprises forming a timing circuitry to provide two non-overlapping clock signals to the pipelined gain stage.

20. The method of claim 19, wherein forming a control circuitry comprises forming a sequential selecting circuitry to selectively pass the analog data from the sampling circuitry to the pipelined gain stage in coordination with one of said two non-overlapping clock signals.

21. The method of claim 20, wherein forming a sampling circuitry comprises forming a correlated double sampling circuitry without amplification circuitry.

22. The method of claim 21, wherein forming a pipelined gain stage comprises forming a fully differential, programmable pipelined gain stage.

23. The method of claim 22, wherein forming a pipelined gain stage comprises forming a first gain stage including two programmable capacitors optimized to provide, in conjunction with capacitors in the sampling circuitry, a gain of less than three.

24. The method of claim 22, wherein forming a pipelined analog-to-digital converter comprises forming a fully differential one and a half bit error-correcting analog-to-digital converter.

25. The method of claim 22, wherein forming an image sensor array comprises forming an active pixel sensor array.

26. The method of claim 22, wherein all of said forming comprises using a complementary metal oxide semiconductor manufacturing process.

27. An active pixel sensor camera system comprising:
   an active pixel sensor array comprising rows and columns of elements configured to receive photons and form an electrical representation of the received photons;

a parallel sampling circuitry coupled with the active pixel sensor array and configured to sequentially sample groups of the elements to obtain analog voltages corresponding to the electrical representations;

a pipelined gain stage coupled with the parallel sampling circuitry and configured to serially amplify the obtained analog voltages;

a pipelined analog-to-digital converter coupled with the pipelined gain stage and configured to convert the amplified analog voltages into digital pixel data and to transfer the digital pixel data to an output port; and an image display device coupled with the output port and having a display screen, the image display device configured to transfer pixel data from the output port, such that the device arranges the pixel data in sequential order of rows to display a visual image, corresponding to the received photons, on the display screen.

28. The camera system of claim 27, wherein the pipelined gain stage comprises a programmable fully differential switched capacitor circuitry.

29. The camera system of claim 28, wherein the pipelined gain stage comprises a first gain stage and a second gain stage, wherein the first gain stage provides a gain of less than two.

30. The camera system of claim 28, wherein the pipelined gain stage comprises three gain stages.

31. The camera system of claim 28, wherein the pipelined analog-to-digital converter comprises a fully differential error-correcting analog-to-digital converter.

32. The camera system of claim 31, wherein the parallel sampling circuitry comprises parallel sample and hold and charge mode readout circuitry without amplification circuitry.

33. The camera system of claim 27, further comprising a control circuitry to perform digital processing operations on the digital pixel data before the digital pixel data is transferred to the output port.

34. The camera system of claim 33, wherein the digital processing operations comprise black level calibration and correction.

35. The camera system of claim 34, further comprising a micro-lens layer.

* * * * *